Patented Nov. 30, 1937

2,100,369

UNITED STATES PATENT OFFICE 2,100,369

TEXTILE MATERIALS AND METHOD OF MAKING SAME

William Whitehead, Cumberland, Md., assignor to Celanese Corporation of America, a corporation of Delaware No Drawing. Application July 20, 1935, Serial No. 32,455

10 Claims. (Cl. 260—101)

This invention relates to the production of organic acid esters of hydroxy alkyl ethers of cellulose, and more particularly to the production of ethyl hydroxy cellulose acetate and the films, filaments, yarns, etc. made therefrom.

An object of the invention is the manufacture of an artificial textile material that is more resistant to saponification by alkaline treatments than cellulose acetate. Other objects of the invention will appear from the following detailed description.

It is known that alkyl esters of hydroxy alkyl ethers of cellulose may be formed by acylating hydroxy alkyl ethers of cellulose in the presence of a catalyst. I have now found that improved products, both from the point of view of heat tests and also in respect to their solubility characteristics, may be produced by effecting the etherification of cellulose to the hydroxyl alkyl ether of cellulose, and the esterification of that product under such conditions that there is formed a product having a high acyl value. Furthermore, the products are more resistant to saponification by alkaline baths than the corresponding simple ester of cellulose.

In accordance with my invention, I etherify alkali-cellulose with ethylene oxide or its homologues and then esterify the product obtained in the presence of a catalyst under such conditions that the ester of a hydroxy ether of cellulose formed has a high acyl value, i. e. an acyl value above that theoretically required to produce an ester having more than two and one half acyl groups on the basis of cellulose molecule of six carbon atoms.

The organic acid ester of hydroxy alkyl ether of cellulose produced in accordance with this invention may be used for any purpose to which cellulose ethers or esters have in the past been applied, for example, to the manufacture of artificial silk, by wet or dry spinning methods, ribbons, films, lacquers, dopes, varnishes, plastics, molding powders, etc.

The invention will be described with particular reference to the production of ethyl hydroxy cellulose acetate, it being understood, however, that other hydroxy alkyl groups may replace all or a part of the ethyl hydroxy group, and other aliphatic organic acid groups may replace all or a part of the acetyl groups.

Cellulose hydroxy ethyl ether that is suitable for acetylation in accordance with this invention may be formed by treating 4 parts by weight of cellulose with 12 parts by weight of sodium hydroxide dissolved in water to form a 20% solution. The treatment of the cellulose with the sodium hydroxide solution is carried out by mixing the two together for from 2½ to 4 hours at about 25° C. The product, an alkali-cellulose, is then drained and/or centrifuged to as dry a condition as possible. The alkali-cellulose may then be treated with from 3.5 to 4.5, preferably 4 parts, by weight of ethylene oxide or a molecular equivalent of one or more of its homologues. The reaction of the ethylene oxide or its homologues and the alkali-cellulose is preferably carried out at an elevated pressure of from 5 to 12 pounds per square inch. The etherifying reaction may be carried out at a temperature below 25° C., which reduced temperature is maintained by cooling the reaction chamber. Cellulose ethers thus produced may be washed with methyl or ethyl alcohol, at least one and preferably the last alcohol washing, where it is necessary to wash the same more than once, containing enough acetic or similar acid to neutralize any residual alkali.

I have found that the amount of ethylene oxide or its homologues, added to the alkali-cellulose, is quite critical. A smaller amount than that specified above results in a product which is soluble in alkali, but not in water, while an amount greater than that specified above results in an ether which gels in alcohol and, consequently, difficulties arise in freeing it from the liberated alkali. Examples of the homologues of ethylene oxide that may be used in place of all or a part of the ethylene oxide as the etherifying agent are propionyl oxide, butylene oxide, epichlorhydrin, glycide and glycidic acid.

In place of all or a part of the sodium hydroxide employed in the above described process, there may be used potassium hydroxide or ammonium hydroxide, the latter being preferred as the same may be removed from the cellulose ether by evaporation. Instead of washing the product of the etherification process with alcohol, as stated above, the product may be freed from alkali by dialysis through a cotton bag coated with regenerated cellulose or any other suitable dialyzer.

The product produced as above is a water-soluble ether of cellulose and, calculated on the amount of ethylene oxide reacted, would appear to be a tri-ethyl hydroxy ether of cellulose.

The dry cellulose ether, prepared as stated above, may be acetylated until it has an acetyl value of above 50%, calculated as acetic acid, and until it is soluble in acetone. The acetylation may be performed by pretreating 10 parts by weight of the hydroxy alkyl cellulose ether with from 100 to 200 parts by weight of a lower fatty acid, for example, acetic acid, and esterifying the pretreated cellulose ether with acetic anhydride in the presence of a catalyst. The pretreatment comprises the mixing together for from 1 to 2 hours at about 25° C. the hydroxy alkyl cellulose ether and the acid. The acetylation of the pretreated hydroxy alkyl cellulose ether may be performed by adding to the mixture, of hydroxy alkyl cellulose ether and acid, resulting from the pretreatment step, from 40 to 75 parts by weight of acetic anhydride, and from 0.3 to 1 part by weight of sulphuric acid, and allowing the resulting mixture to react for from 4 to 6 hours at a temperature of about 25° C. This treatment results in a product having an acetyl value of from 50 to 55%, calculated as acetic acid. The sulphuric acid employed as a catalyst is preferably added to the cellulose ether during the pretreating step.

A part or all of the sulphuric acid may be replaced by other suitable catalysts, for instance, hydrochloric acid, zinc chloride, etc. When employing a halogen or halogen containing compound as catalyst, a longer time of reaction will be required. For instance, when using 2 parts by weight of zinc chloride, in the above described process, as catalyst, the time of acetylation may be extended to from 36 to 50 hours. After acetylation, the catalyst may be neutralized and/or washed from the product in any suitable manner. For instance, those methods used in the production of cellulose acetate may be utilized in neutralizing the catalyst and removing it from the finished product. The cellulose ether may be similarly esterified with other organic acid radicles, for instance, formic, propionic, butyric, etc. Further, formic acid and one or more organic acid anhydrides, or two or more organic acid anhydrides, may be employed in the esterification mixture to produce mixed esters of the cellulose ether. It is important, however, that the acid radical value of the resulting ester be greater than that calculated to produce an ester having more than 2½ acyl groups to a cellulose group, the cellulose group containing 6 carbon atoms.

The organic acid ester of hydroxy alkyl ether of cellulose may be dissolved and mixed with pigments, fillers, dyes, lakes, resins, fire retardants, etc. to form lacquers, dopes, coating materials, etc. They may also be dissolved in volatile solvents with or without plasticizers, dyes, lakes, pigments, fire retardants, etc., and extruded through suitable orifices into an evaporative atmosphere or a precipitating medium to form filaments, yarns, straws, ribbons, etc., or cast upon a smooth surface to form films, foils, sheets and the like.

As an illustration of the invention and not as a limitation, the following example is given:

Example

4½ pounds of cellulose (wood pulp) are immersed in 5 gallons of cold 20% sodium hydroxide solution and the two mixed together for 3 hours at room temperature (25° C.). At the end of this time, the mixture is centrifuged as dry as possible. The centrifuged product is then placed in a gas tight reaction chamber. The air is evacuated and ethylene oxide gas is admitted to build up a pressure of 7 pounds per square inch. The gas is absorbed very rapidly and the rate of addition is regulated so that the temperature of the reaction mixture may be kept below 20° C. by means of cold water circulating in a jacket surrounding the reaction chamber. The addition of ethylene oxide gas is maintained until approximately 4 pounds of same is added. The product produced is given a series of 4 washes with methyl alcohol, the last wash containing a trace of acetic acid sufficient to neutralize the residual alkali. Five pounds of the ether thus produced is mixed with about 75 pounds of acetic acid and 0.5 of a pound of sulphuric acid for 1½ hours at 25° C. To the mixture of acetic acid and cellulose ether are then added 25 pounds by weight of acetic anhydride and the same allowed to react for 5 hours at 25° C. This produces an acetate ester of hydroxy ethyl ether of cellulose having an acetyl value, calculated as acetic acid, of 53.5%, said ester being soluble in acetone, capable of being manufactured into textile materials by devices and methods formerly used in working with cellulose acetate, and the products thereof are resistant to saponification by alkali treatments.

It is to be understood that the foregoing detailed description is given merely by way of illustration and that many variations may be made therein without departing from the spirit of my invention.

Having described my invention, what I desire to secure by Letters Patent is:

1. In a process for the manufacture of organic acid esters of cellulose hydroxy alkyl ethers, the steps of forming an alkali-cellulose etherifying the alkali-cellulose with an etherifying agent selected from the group consisting of ethylene oxide and the homologues thereof, the amount of etherifying agent being from 3.5 to 4.5 parts by weight of ethylene oxide or molecular equivalents of its homologues, and esterifying the alkyl hydroxy ether of cellulose so produced in the presence of a condensing agent in such a manner that there are more than 2½ acyl groups combined with said alkyl hydroxy ether of cellulose.

2. In a process for the manufacture of organic acid esters of cellulose hydroxy ethyl ether, the steps of forming an alkali-cellulose, treating the alkali-cellulose with 4 parts by weight of ethylene oxide, and esterifying the ethyl hydroxy ether of cellulose so produced in the presence of a condensing agent in such a manner that there are more than 2½ acyl groups combined with said ethyl hydroxy ether of cellulose.

3. In a process for the manufacture of acetic acid esters of cellulose hydroxy alkyl ethers, the steps of forming alkali-cellulose, etherifying the alkali-cellulose with an etherifying agent selected from the group consisting of ethylene oxide and the homologues thereof, the amount of etherifying agent being from 3.4 to 4.5 parts by weight of ethylene oxide or the molecular equivalents of its homologues, and acetylating the tri-alkyl hydroxy ether of cellulose so produced in the presence of a condensing agent in such a manner that there are more than 2½ acetyl groups combined with said alkyl hydroxy ether of cellulose.

4. In a process for the manufacture of acetic acid esters of cellulose hydroxy ethyl ether, the steps of forming alkali-cellulose, treating the alkali-cellulose with 4 parts by weight of ethylene oxide, and acetylating the tri-ethyl hydroxy ether of cellulose so produced in the presence of a condensing agent in such a manner that there are more than 2½ acetyl groups combined with said ethyl hydroxy ether of cellulose.

5. In a process for the manufacture of organic acid esters of cellulose hydroxy alkyl ethers, the steps of forming alkali-cellulose, etherifying the alkali-cellulose with an etherifying agent selected from the group consisting of ethylene oxide and the homologues thereof, the amount of etherifying agent being from 3.5 to 4.5 parts by weight of ethylene oxide or molecular equivalents of its homologues, and esterifying the alkyl hydroxy ether of cellulose so produced with an organic acid anhydride in the presence of a condensing agent so that the products contain more than 2½ acylated hydroxy alkyl ether groups per molecule of cellulose.

6. In a process for the manufacture of organic acid esters of cellulose hydroxy ethyl ether, the steps of forming an alkali-cellulose, treating the alkali-cellulose with 4 parts by weight of ethylene oxide and esterifying the ethyl hydroxy ether of cellulose so produced with an organic acid anhydride in the presence of a condensing agent so that the products contain more than 2½ acylated hydroxy ethyl ether groups per molecule of cellulose.

7. In a process for the manufacture of acetic acid esters of cellulose hydroxy ethyl ether, the steps of forming alkali-cellulose, treating the alkali-cellulose with 4 parts by weight of ethylene oxide and treating the ethyl hydroxy ether of cellulose so produced with acetic acid anhydride in the presence of a condensing agent whereby products containing more than 2½ acetylated hydroxy ethyl ether groups per molecule of cellulose are produced.

8. In a process for the manufacture of acetic acid esters of cellulose hydroxy ethyl ether, the steps of forming alkali-cellulose, treating the alkali-cellulose with 4 parts by weight of ethylene oxide, pretreating the ethyl hydroxy ether of cellulose so produced with a lower aliphatic acid and subjecting the pretreated ethyl hydroxy ether of cellulose to the action of acetic acid anhydride in the presence of a condensing agent whereby products containing more than 2½ acetylated hydroxy ethyl ether groups per molecule of cellulose are produced.

9. In a process for the manufacture of acetic acid esters of cellulose hydroxy ethyl ether, the steps of forming alkali-cellulose, treating the alkali-cellulose with 4 parts by weight of ethylene oxide, pretreating the ethyl hydroxy ether of cellulose so produced with a lower aliphatic acid and subjecting the pretreated ethyl hydroxy ether of cellulose to the action of acetic acid anhydride in the presence of sulphuric acid whereby products containing more than 2½ acetylated hydroxy ethyl ether groups per molecule of cellulose are produced.

10. In a process for the manufacture of acetic acid esters of cellulose hydroxy ethyl ether, the steps of forming alkali-cellulose, treating the alkali-cellulose with 4 parts by weight of ethylene oxide, pretreating the ethyl hydroxy ether of cellulose so produced with a lower aliphatic acid and subjecting the pretreated ethyl hydroxy ether of cellulose to the action of acetic acid anhydride in the presence of zinc chloride whereby products containing more than 2½ acetylated hydroxy ethyl ether groups per molecule of cellulose are produced.

WILLIAM WHITEHEAD.